United States Patent [19]
Chow et al.

[11] Patent Number: 5,526,990
[45] Date of Patent: Jun. 18, 1996

[54] APPARATUS FOR SEPARATING WOOD FIBERS FROM OTHER FIBERS IN FIBREMAT RESIDUES

[75] Inventors: Suezone Chow, Richmond; Julio E. Nunez; Romulo C. Casilla, both of Vancouver, all of Canada

[73] Assignee: Canadian Forest Products Ltd., Vancouver, Canada

[21] Appl. No.: 294,515

[22] Filed: Aug. 23, 1994

[51] Int. Cl.⁶ .................. B02C 13/284; B02C 13/288; B02C 23/20; B02C 25/00
[52] U.S. Cl. .................. 241/34; 241/36; 241/49; 241/60; 241/73; 241/79.1; 241/186.2; 241/242
[58] Field of Search ............... 241/14, 28, 34, 241/36, 49, 58, 60, 73, 79.1, 186.2, 222, 242

[56] References Cited

U.S. PATENT DOCUMENTS

| | | |
|---|---|---|
| 3,702,682 | 11/1973 | Williams .................. 241/73 X |
| 3,899,139 | 8/1975 | Okada .................. 241/73 X |
| 4,183,471 | 1/1980 | Pfister .................. 241/73 X |
| 4,241,881 | 12/1980 | Laumer .................. 241/28 |
| 4,433,813 | 2/1984 | Whatton et al. .................. 241/28 X |
| 4,572,440 | 2/1986 | Tao .................. 241/28 X |
| 4,650,127 | 3/1987 | Radwanski et al. .................. 241/28 |
| 4,664,320 | 5/1987 | Steffins .................. 241/73 X |

Primary Examiner—Timothy V. Eley

[57] ABSTRACT

Residues from fibermat materials are broken down and separated into wood fibers and other fibers so that the fibers may be recycled. If the fibermat residues are not recycled, they present a disposal problem due to the uncured resins that become toxic waste. The fibermat residues are cut and separated by rotating cutting heads within a cutting and separating chamber. The wood fibers, being the heavier fibers, settle out, pass through a screen into a collection chamber and the lighter textile fibers are sucked out of the cutting and separating chamber with a vacuum system.

10 Claims, 2 Drawing Sheets

APPARATUS FOR SEPARATING WOOD FIBERS FROM OTHER FIBERS IN FIBREMAT RESIDUES

TECHNICAL FIELD

The present invention relates to recycling fibremat products and more specifically to separating wood fibres from other fibres in fibremat residues.

BACKGROUND ART

Fibremat or wood mat materials are made predominantly of wood fibre and have a small percent of either a synthetic or a natural fibre bonded together with an adhesive resin generally a phenol formaldehyde resin. These products are used for car door panels and other special applications and have the ability of being moulded to the desired shape and size. However, there are always residues in the form of trims and trimmings from the moulding operations and there is difficulty in recycling these residues since the finished fibremat product has been cured and therefore is not easily broken down. Thus, the growing demand for fibremat and moulded products impacts on the concern for the disposal of the residues. Combustion of the residues is preferably avoided because it emits toxic substances into the air. Likewise, using the residue as a landfill is not acceptable as it can leach out toxic substances into the ground. It has been found that an effective recycling of the residue requires the separation of its fibre components.

Fibremat consists of 88% to 95% wood fibre and 5% to 12% synthetic fibre or natural fibre. These other fibres are preferably long fibres, for instance, long synthetic fibres, namely polyester fibre, polyolefin fibre and cellulosic fibre, or long natural fibres, for example, flax, abaca, ramie, kenaf, hemp and jute.

Wood fibres and other fibres are blended together by passing them through a toothed roller and then deposited pneumatically in an air-laying process to form the mat. A fine synthetic scrim is fed onto the bottom of the thick mat as a carrier and the mat and scrim assembly is needled to produce a strong fibremat with interlocked wood fibre and synthetic fibre. The fibremat is treated with from 6% to 15% by weight of phenol formaldehyde resin based on the oven dry weight of the wood fibre and contains a small percentage of slack wax which is incorporated as 1% to 2% by weight of the wood chips from which the wood fibre is made. This combination is heated and pressed in a mould so that the resin cures. The trim and trimmings are cut from the moulded product and constitute the residues that require recycling.

DISCLOSURE OF INVENTION

It is an aim of the present invention to separate the fibremat residues into the wood fibres and other fibres, namely natural fibres or synthetic fibres, in order to provide an effective recycling. Both the wood fibres and the other fibres may then be reused provided they have been reasonably well separated from the original fibremat residues.

In one embodiment the present invention provides an apparatus for separating wood fibres from other fibres in fibremat residues, comprising: a feed chute for fibremat residues leading to a control chamber, a cutting and separating chamber below the control chamber having at least one rotatable cutting head therein adapted to cut up the fibremat residues and separate the wood fibres from the other fibres, rotating means to rotate the cutting head at a speed to cut up the fibremat residues, a screen positioned below the cutting and separating chamber having mesh size to permit wood fibres to pass therethrough, wood fibre collection system to collect wood fibres that pass through the screen, and a fibre vacuum connector above the cutting and separating chamber for a vacuum system to remove the other fibres from the control chamber.

In another embodiment of the invention there is provided a method of separating wood fibres from other fibres in fibremat residues, comprising the steps of: cutting and separating fibremat residue within a cutting and separating chamber into wood fibres and other fibres, collecting the wood fibres passing through a screen below the cutting and separating chamber, and collecting the other fibres from above the cutting and separating chamber with a vacuum system.

In a still further embodiment of the present invention there is provided a method of separating wood fibres from other fibres in fibremat residues, comprising the steps of: feeding fibremat residues into a feed chute, through an open upper gate of a control chamber and into a cutting and separating chamber below the control chamber, closing the upper gate, rotating at least one cutting head within the cutting and separating chamber to cut and separate the wood fibres from the other fibres, the wood fibres falling through a screen mesh positioned below the cutting and separating chamber, withdrawing the wood fibres that fall through the screen, opening a side gate in the control chamber and withdrawing the other fibres out of the control chamber and the cutting and separating chamber through a fibre vacuum connector, closing the side gate when the other fibres are withdrawn from the control chamber and the cutting and separating chamber, and opening the upper gate to feed another batch of fibremat residues to the cutting and separating chamber.

BRIEF DESCRIPTION OF DRAWINGS

In drawings which illustrate embodiments of the present invention.

BEST MODE FOR CARRYING OUT THE INVENTION

Figure 1:
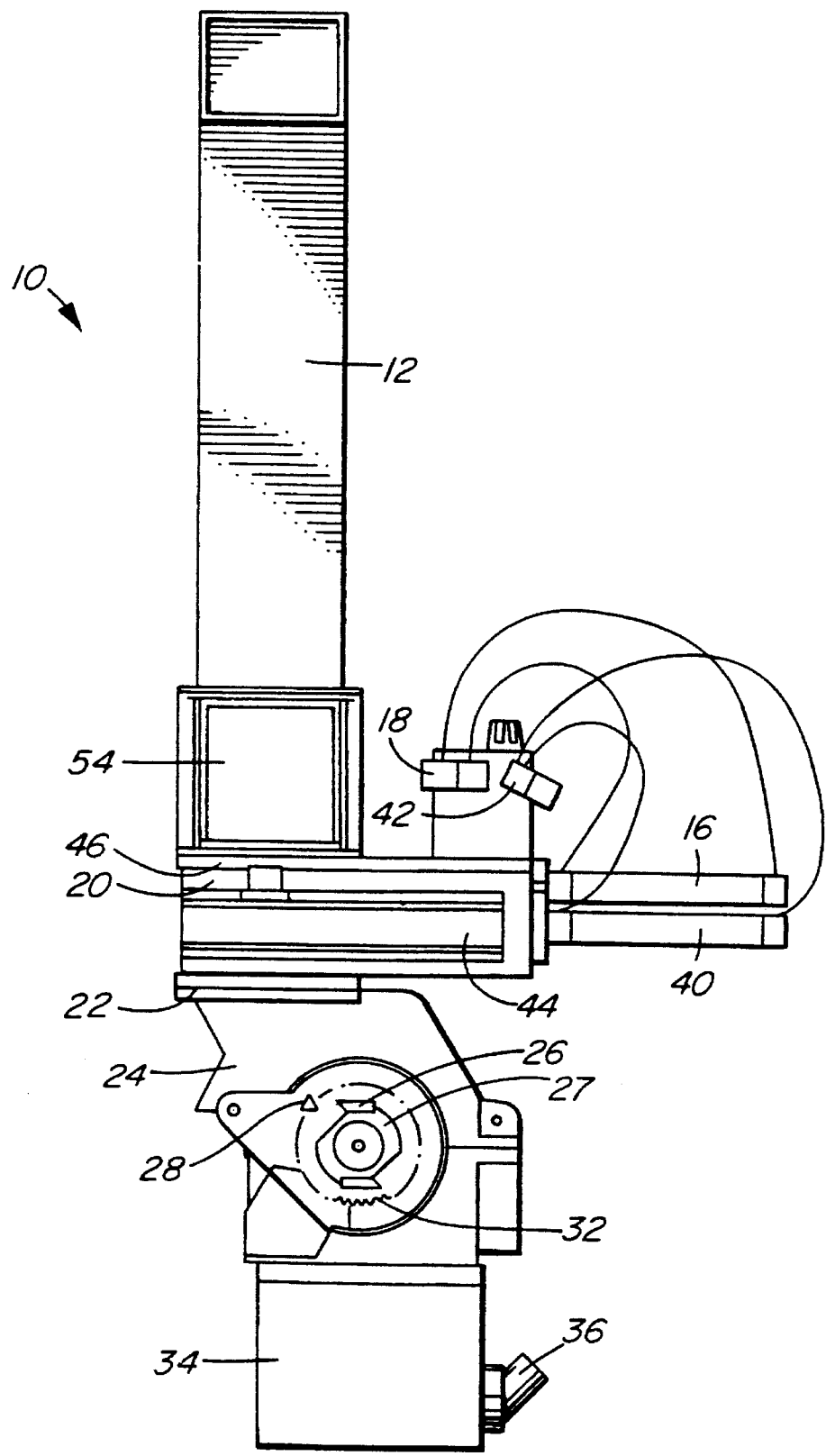
FIG. 1 is front elevational view showing one embodiment of an apparatus for separating wood fibres from other fibres in fibremat residues.
Figure 2:
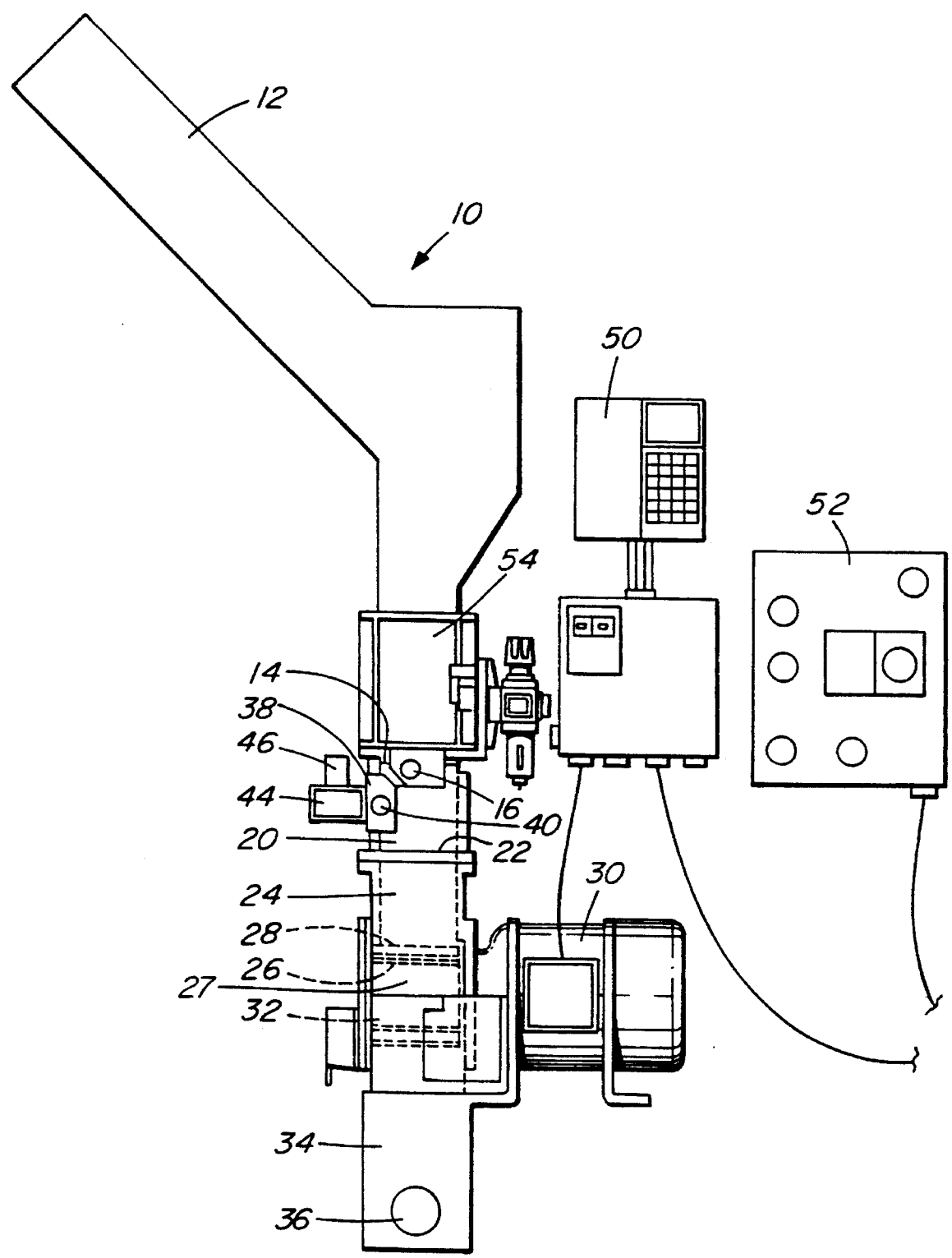
FIG. 2 is a side view of the apparatus shown in FIG. 1.

Referring now to the drawings, separating apparatus 10 comprises an infeed chute 12 into which fibremat residues are placed. These residues fall under the influence of gravity onto an upper gate 14 which is opened and closed by a first pneumatic cylinder 16 controlled by a first solenoid valve 18 to an air supply system. Beneath the upper gate 14 is a pneumatic control chamber 20 which has an opening 22 in the base thereof into a cutting and separating chamber 24. This cutting and separating chamber 24 has two rotating cutting blades 26 spaced apart and attached to a rotating head 27. A fixed cutting blade 28 is positioned between the rotating blades 26. The rotating head 27 is driven by a motor 30 and in a preferred embodiment a variable speed drive is provided so the rotational speed of the cutting heads can be changed.

Directly beneath the rotating head 27 is a semicircular metallic screen 32 which has a mesh size sufficient to permit the wood fibres to pass therethrough and fall into a collection chamber 34. A wood fibre suction system connector 36 is shown attached to the collection chamber 34. This permits the wood fibres to be withdrawn from the chamber for recycling.

A side gate 38 is positioned on one side of the pneumatic control chamber 20. This side gate 38 is connected to a second pneumatic cylinder 40 which in turn is controlled by a second solenoid valve 42 to an air supply system. The side gate 38 opens into a textile fibre vacuum chamber 44 with a textile fibre suction system connector 46 for connection to a suction system for withdrawing the textile fibres or other fibres that have been separated from the fibremat residues.

In operation the upper gate 14 is initially open, and the cutting blades 26 are rotating at the desired speed to cut and separate the fibremat residues. The residues are passed into the infeed chute 12 and drop through the open upper gate 14 and the pneumatic control chamber 20 into the cutting and separating chamber 24. The upper gate 14 is then closed to ensure longer residence time of the residues inside the cutting and separating chamber 24. As the rotating blades rotate at high speed, the fibremat residues are stretched, cut and beaten, forcing the wood fibres to separate from the fibre matrix so the wood fibres and textile fibres separate. This separation is enhanced by the centrifugal forces imposed by the rotational movement of the residues. The wood fibres are heavier than the textile fibres and also a great deal smaller, the wood fibres are evacuated from the cutting and separating chamber 24 and pass through the metallic screen 32 falling into the collection chamber 34. The vacuum system attached to the connector 36 of the collection chamber 34 assists in pulling the wood fibres through the metallic screen 32 and then evacuates these wood fibres to another location for recycling.

The textile fibres, referred to as other fibres, are either natural or synthetic, and are generally longer than the wood fibres and thus do not pass through the metallic screen 32. Instead they tend to entangle themselves to form an amorphous matrix of textile fibres that remain inside the cutting and separating chamber. As the separation process continues, the amorphous matrix of fibres which at this point is predominantly the textile fibres, becomes less dense because the wood fibres are evacuated through the metallic screen 32. When a sufficient amount of wood fibres has been separated from the matrix, the side gate 38 in the pneumatic control chamber 20 is opened and the mat of predominantly textile or other fibres is sucked up into the control chamber 20 through the side gate 38 and into the vacuum chamber 44, hence the fibres pass through the vacuum connection 46 to the textile vacuum removal system (not shown). When the textile fibres have been removed, then the side gate 38 is closed and the upper gate 14 is opened so that a new batch of fibremat residues fall by gravity into the cutting and separating chamber 24.

Because wood fibres are denser than the other fibres or textile fibres, they tend to separate out of the amorphous matrix of fibres that forms in the cutting and separating chamber 24. The density of wood varies greatly between species, however, when solid wood is converted into fibre, the density of the original wood increases because of the reduced volume per unit weight. The length of softwood fibres range from approximately 3 to 8 mm and hardwood fibres average about 1 mm. These distances are sufficiently short that their chances of being entangled with the textile fibres in the separation process is low. This results in their falling onto and through the screen 32 into the collection chamber 34. The synthetic fibres have considerably longer lengths, sometimes 3 inches or more and thus have a strong tendency to become tangled during the separation process to form an aggregate mass of low density. As the separating goes on, then the wood fibres fall out and when the side gate 38 in the pneumatic control chamber 20 is opened then this aggregate mass of textile fibres is withdrawn. The textile fibre mass remains substantially floating inside the cutting and separating chamber 24, primarily due to the air turbulence created by the rotating cutting blades 26.

After a substantial number of tests were conducted, an automatic control system was set up having a variable speed controller 50 for the motor 30 and having an automatic control timer 52 to control the times of the different phases of operation. The timer sets the opening and closing of the upper gate 14 by operating the solenoid 18 to the first pneumatic cylinder 16 and also operates the opening and closing of the side gate 38 by operating the second solenoid 42 to the second pneumatic cylinder 40.

EXAMPLE 1

A vacuum system was installed connected to the textile fibre suction system 46 from the vacuum chamber 44 and an inspection panel 54 was positioned in the infeed chute 12 above the upper gate 14. The infeed weight of fibremat residue varied from 5 to 17 grams and the time required to obtain a reasonable degree of fibre separation was monitored by a visual observation of the whiteness of the synthetic fibre which in this case was polyester fibre. This reasonable degree of separation was later found to correspond to an average of 78% recovered wood fibre and 16% recovered polyester fibre by weight. The results are summarized in Table 1. Processing time increased with increasing weight of infeed residue. Thus, the example demonstrates the fibre separation success of the apparatus.

TABLE 1

Data for the Wood Fiber and Polyester Fiber Separated from the Fibermat Press Trim Residue

| Weight of Infeed Residue (gm) | Amount of Wood Fiber Recovered | | Amount of Polyester Fiber Recovered | | Processing Time (sec) |
|---|---|---|---|---|---|
| | Weight (gm) | % | Weight (gm) | % | |
| 5.20 | 3.45 | 66.35 | 1.07 | 20.58 | 57.07 |
| 6.17 | 4.73 | 76.66 | 1.20 | 19.45 | 71.02 |
| 7.02 | 5.42 | 77.21 | 1.29 | 18.38 | 71.26 |
| 8.18 | 6.31 | 77.14 | 1.59 | 19.44 | 93.40 |
| 9.07 | 7.49 | 82.58 | 1.19 | 13.12 | 111.77 |
| 10.19 | 8.06 | 79.10 | 1.60 | 15.70 | 108.13 |
| 11.15 | 9.02 | 80.90 | 1.64 | 14.71 | 127.40 |
| 12.18 | 9.76 | 80.13 | 2.15 | 17.65 | 121.05 |
| 13.20 | 10.58 | 80.15 | 2.05 | 15.53 | 140.59 |
| 14.08 | 11.46 | 81.39 | 2.31 | 16.41 | 123.21 |
| 15.19 | 12.32 | 81.11 | 2.18 | 14.35 | 174.31 |
| 16.21 | 12.67 | 78.16 | 3.01 | 18.57 | 153.16 |
| 17.06 | 13.84 | 81.13 | 2.66 | 15.59 | 199.20 |

EXAMPLE 2

A test was carried out to determine the effect of processing time on wood fibre and synthetic fibre (polyester fibre) yields. The batch sample used was approximately 10 grams and the processing time varied from 10 to 120 seconds. The separated wood fibre materials were further analyzed by classifying them into various particle sizes using a RO-TAP Testing Sieve Shaker with sieves ranging from 10 to 100 mesh.

The results are shown in Table 2. Fibre yield increased while polyester fibre yield decreased, with increasing processing time, levelling off at about 90 to 100 seconds. After a 90 second processing time, the average wood fibre and polyester fibre yields were about 80% and 17%, respectively, with a loss of 3% fibre material. The predominant particle size was +40 mesh constituting about 32%, followed by the +20 and +60 mesh sizes which constituted about 19% and 17%, respectively, of the fibre as shown in Table 3. Thus, 69% of the separated wood fibre fell within the +20 to +60 mesh size range.

TABLE 2

Data for Separated Fibers Obtained from Press Trim Residues for Varying Processing Time.

| Weight of Infeed Residue (gm) | Amount of Wood Fiber Recovered Weight (gm) | % | Amount of Polyester Fiber Recovered Weight (gm) | % | Processing Time (sec) |
| --- | --- | --- | --- | --- | --- |
| 10.21 | 5.76 | 56.42 | 4.25 | 41.63 | 10.00 |
| 10.14 | 6.52 | 64.30 | 3.34 | 32.94 | 20.00 |
| 10.18 | 6.75 | 66.31 | 3.26 | 32.02 | 30.00 |
| 10.08 | 7.20 | 71.43 | 2.51 | 24.90 | 40.00 |
| 10.18 | 7.78 | 76.42 | 2.05 | 20.14 | 50.00 |
| 10.28 | 7.99 | 77.72 | 1.89 | 18.39 | 60.00 |
| 10.18 | 8.16 | 80.16 | 1.81 | 17.78 | 70.00 |
| 10.24 | 8.37 | 81.74 | 1.37 | 13.38 | 80.00 |
| 10.20 | 8.52 | 83.53 | 1.24 | 12.16 | 90.00 |
| 10.29 | 8.48 | 82.41 | 1.54 | 14.97 | 100.00 |
| 10.12 | 8.35 | 82.51 | 1.76 | 17.39 | 110.00 |
| 10.18 | 8.37 | 82.22 | 1.32 | 12.97 | 120.00 |

TABLE 3

Particle Size Distribution of Separated Wood Fiber

| | Processed Time (seconds) | | | | | | | | | | | |
| --- | --- | --- | --- | --- | --- | --- | --- | --- | --- | --- | --- | --- |
| Through | 10 | | 20 | | 30 | | 60 | | 90 | | 120 | |
| Screen Size | Weight (gm) | % | Weight (gm) | % | Weight (gm) | % | Weight (gm) | % | Weight (gm) | % | Weight (gm) | % |
| #10 | 0.25 | 4.40 | 0.16 | 2.51 | 0.08 | 1.19 | 0.62 | 7.81 | 0.22 | 2.59 | 1.00 | 12.14 |
| #14 | 0.21 | 3.70 | 0.21 | 3.30 | 0.18 | 2.67 | 0.48 | 6.05 | 0.22 | 2.59 | 0.20 | 2.43 |
| #20 | 1.13 | 19.89 | 0.87 | 13.66 | 1.26 | 18.72 | 2.06 | 25.94 | 1.14 | 13.40 | 1.80 | 21.84 |
| #40 | 1.98 | 34.86 | 2.08 | 32.65 | 2.24 | 33.28 | 2.53 | 31.86 | 2.85 | 33.49 | 2.32 | 28.16 |
| #60 | 0.90 | 15.85 | 1.32 | 21.04 | 1.45 | 21.55 | 1.02 | 12.85 | 1.65 | 19.39 | 1.07 | 12.99 |
| #80 | 0.75 | 13.20 | 0.92 | 14.44 | 0.40 | 5.94 | 0.63 | 7.93 | 1.21 | 14.22 | 0.88 | 10.68 |
| #100 | 0.20 | 3.52 | 0.46 | 7.22 | 0.42 | 6.24 | 0.21 | 2.64 | 0.44 | 5.17 | 0.24 | 2.91 |
| −100 | 0.13 | 2.82 | 0.36 | 5.65 | 0.63 | 9.36 | 0.18 | 2.27 | 0.63 | 7.40 | 0.39 | 4.73 |

EXAMPLE 3

A test was carried out to evaluate the influence of the different treatment combinations of compressed air and vacuum applications. In the first operating condition no compressed air was applied and no vacuum was applied to the collection chamber 34. In the second operating condition a vacuum was applied to the collection chamber 34 and in the third operating condition a vacuum was applied to the collection chamber 34 and at the same time compressed air was applied at the top of the infeed chute 12.

Batches of approximately 10 grams of loosened press trim residue were weighed and processed in the machine under the following operating conditions:

Rotational speed: 3500 rpm

Knife gap: 3.7 mm

Screen size: 5 mm mesh

Processing time: 30 seconds

The results are shown in Tables 4A, 4B and 4C for the three conditions. As can be seen, the separation process was most effective when a vacuum was applied to the collection chamber 34. The process time of only 30 seconds, yields an average separation level of 80.6% wood fibre and 15.8% synthetic (polyester) fibre. The application of vacuum at the bottom of the chamber contributed to reach a similar fibre separation performance as that obtained in Example 2, but in a substantially shorter period of time.

TABLE 4A

Results of the fiber separation tests using different treatment combinations of compressed air and vacuum applications.
Air Applied: No
Vacuum Applied: No

| | Infeed Fiber | Wood Fiber | | Polyester Fiber | |
| --- | --- | --- | --- | --- | --- |
| Sample # | (g) | (g) | (%) | (g) | (%) |
| 01–11 | 10.50 | 7.40 | 70.48 | 2.52 | 24.00 |
| 12 | 10.36 | 7.01 | 67.66 | 2.80 | 27.03 |
| 13 | 10.46 | 7.49 | 71.61 | 2.32 | 22.18 |
| 14 | 10.13 | 7.67 | 75.72 | 1.72 | 16.98 |
| 15 | 10.28 | 7.45 | 72.47 | 2.27 | 22.08 |
| Average | 10.35 | Average | 71.59 | Average | 22.45 |

TABLE 4B

Air Applied: No
Vacuum Applied: Yes

| | Infeed Fiber | Wood Fiber | | Polyester Fiber | |
| --- | --- | --- | --- | --- | --- |
| Sample # | (g) | (g) | (%) | (g) | (%) |
| 01–21 | 10.06 | 7.89 | 78.43 | 1.85 | 18.39 |
| 22 | 10.40 | 8.32 | 80.00 | 1.56 | 15.00 |
| 23 | 10.28 | 8.57 | 83.37 | 1.40 | 13.62 |
| 24 | 10.33 | 8.42 | 81.51 | 1.65 | 15.97 |
| 25 | 10.23 | 8.15 | 79.67 | 1.63 | 15.93 |
| Average | 10.26 | Average | 80.59 | Average | 15.78 |

TABLE 4C

Air Applied: Yes
Vacuum Applied: Yes

| Sample # | Infeed Fiber (g) | Wood Fiber (g) | Wood Fiber (%) | Polyester Fiber (g) | Polyester Fiber (%) |
|---|---|---|---|---|---|
| 01-31 | 10.31 | 7.95 | 77.11 | 1.85 | 17.94 |
| 32 | 10.43 | 8.01 | 76.80 | 1.90 | 18.22 |
| 33 | 10.38 | 8.05 | 77.55 | 1.74 | 16.76 |
| 34 | 10.50 | 8.16 | 77.71 | 1.83 | 17.43 |
| 35 | 10.40 | 8.20 | 78.85 | 1.67 | 16.06 |
| Average | 10.40 | Average | 77.60 | Average | 17.28 |

EXAMPLE 4

This experiment was conducted to examine the effect of rotational speed on the effectiveness of fibre separation. Also, the fixed knife was removed from the cutting chamber to evaluate its effect on separated wood fibre size distribution and process performance. Batches of approximately 30 grams of loosened press trim residue were weighed and processed in the machine under the following constant conditions:

Knife gap: 4.2 mm (fixed knife removed)

Screen size: 5 mm mesh

Air applied: No

Vacuum applied: Yes

Processing time: 35 seconds

Tables 5A, 5B, 5C and 5D show the effectiveness of the separation process which improves as the rotational speed increases. The maximum performance occurs at 4,375 to 4,667 rpm. Separation levels of approximately 84% wood fibre and 14% synthetic (polyester) fibre were achieved at these rotational speeds. The example also demonstrated that the removal of the fixed blade did not significantly effect the fibre size distribution which was substantially the same as that obtained in Example 2.

TABLE 5A

Results of the fiber separation test under varying rotational speed.
Rotational Speed: 3792 rpm (65 Hz)

| Sample # | Infeed Fiber (g) | Wood Fiber (g) | Wood Fiber (%) | Polyester Fiber (g) | Polyester Fiber (%) |
|---|---|---|---|---|---|
| 01-11 | 30.84 | 24.41 | 79.15 | 5.61 | 18.19 |
| 12 | 30.77 | 24.11 | 78.36 | 5.83 | 18.95 |
| 13 | 30.95 | 24.42 | 78.90 | 5.60 | 18.09 |
| Average | 30.85 | Average | 78.80 | Average | 18.41 |

TABLE 5B

Rotational Speed: 4083 rpm (70 Hz)

| Sample # | Infeed Fiber (g) | Wood Fiber (g) | Wood Fiber (%) | Polyester Fiber (g) | Polyester Fiber (%) |
|---|---|---|---|---|---|
| 01-21 | 30.29 | 23.92 | 78.97 | 5.64 | 18.62 |
| 22 | 30.28 | 24.80 | 81.90 | 4.69 | 15.49 |
| 23 | 30.02 | 24.41 | 81.31 | 5.00 | 16.66 |
| Average | 30.20 | Average | 80.73 | Average | 16.92 |

TABLE 5C

Rotational Speed: 4375 rpm (75 Hz)

| Sample # | Infeed Fiber (g) | Wood Fiber (g) | Wood Fiber (%) | Polyester Fiber (g) | Polyester Fiber (%) |
|---|---|---|---|---|---|
| 06-31 | 29.92 | 25.80 | 86.23 | 3.46 | 11.56 |
| 32 | 30.87 | 25.40 | 82.28 | 4.99 | 16.16 |
| 33 | 30.23 | 25.13 | 83.13 | 4.63 | 15.32 |
| Average | 30.34 | Average | 83.88 | Average | 14.35 |

TABLE 5D

Rotational Speed: 4667 rpm (80 Hz)

| Sample # | Infeed Fiber (g) | Wood Fiber (g) | Wood Fiber (%) | Polyester Fiber (g) | Polyester Fiber (%) |
|---|---|---|---|---|---|
| 06-41 | 30.66 | 25.50 | 83.17 | 4.37 | 14.25 |
| 42 | 30.63 | 25.31 | 82.63 | 4.89 | 15.96 |
| 43 | 31.11 | 27.36 | 87.95 | 2.84 | 9.13 |
| Average | 30.80 | Average | 84.58 | Average | 13.12 |

EXAMPLE 5

This study was conducted to determine the effect of screen size on the effectiveness of fibre separation under a continuous manual operation of the machine. The screen sizes used were 5 mm and 8 mm mesh. All other operating conditions were kept constant as follows:

Rotational speed: 4,375 rpm

Knife gap: 4.2 mm (fixed knife removed)

Air applied: No

Vacuum applied: Yes

Loosened residue batch size: 30 gm

The results are shown in Table 6 for the 5 mm screen at a processing time of 25 seconds. The degree of fibre separation obtained was 85% wood fibre and 14.8% synthetic (polyester) fibre. Fibre losses were approximately 0.2%. For the 8 mm screen, the results are shown in Tables 7A and 7B, for a 20 second processing time and a 25 second processing time. This processing time was reduced to 20 seconds to achieve even slightly higher performance levels of 85.5% wood fibre and 14% polyester fibre. For a processing time of 25 seconds, an improvement in performance was achieved corresponding to 87.4% wood fibre and 11.9% polyester fibre, with fibre losses of only 0.7%.

The degree of fibre separation obtained in this experiment where the machine was operated in a continuous mode was higher than that observed in Example 4 where the operation was on a batch mode.

TABLE 6

Fiber Separation Process Using 5 mm Size Screen
Processing time: 25 seconds

| Batch # | Initial Weight (g) | |
|---|---|---|
| 10-31 | 29.82 | |
| 32 | 31.35 | |
| 33 | 30.94 | |
| Average | 30.70 | |
| Total weight of material (g): | 92.11 g | 100.00% |
| Weight of wood fiber: | 78.28 g | 84.99% |
| Weight of polyester fiber: | 13.61 g | 14.78% |

TABLE 6-continued

Fiber Separation Process Using 5 mm Size Screen
Processing time: 25 seconds

| | | |
|---|---|---|
| Loss of material in the process: | 0.22 g | 0.24% |

TABLE 7A

Fiber Separation Process Using 8 mm Size Screen
Processing time: 20 seconds

| Batch # | Initial Weight (g) | |
|---|---|---|
| 11–31 | 31.88 | |
| 32 | 30.70 | |
| 33 | 30.75 | |
| Average | 31.11 | |
| Total weight of material (g): | 93.33 g | 100.00% |
| Weight of wood fiber: | 79.78 g | 85.48% |
| Weight of polyester fiber: | 13.17 g | 14.11% |
| Loss of material in the process: | 0.38 g | 0.41% |

TABLE 7B

Processing time: 25 seconds

| Batch # | Initial Weight (g) | |
|---|---|---|
| 11–41 | 30.87 | |
| 42 | 30.25 | |
| 43 | 31.56 | |
| Average | 30.89 | |
| Total weight of material (g): | 92.68 g | 100.00% |
| Weight of wood fiber: | 81.04 g | 87.44% |
| Weight of polyester fiber: | 11.00 g | 11.87% |
| Loss of material in the process: | 0.64 g | 0.69% |

EXAMPLE 6

This study was similar to that of Example 5, except that the fibre separation was done under a continuous automatic operation of the machine. The following conditions were also kept constant:

Rotation speed: 4,375 rpm
Knife gap: 4.2 mm (fixed knife removed)
Loosened residue batch size: 30 gm
Air applied: No
Vacuum applied: Yes
Processing time: 26 seconds
Synthetic (polyester) fibre removal time: 5 seconds
Delay time: 4 seconds
Time to complete 35 seconds
1 cycle: (total of processing time, polyester fibre removal time and delay time)

The results are shown in Tables 8A to 8D for the 5 mm screen, and Tables 9A to 9C for the 8 mm mesh size screen. As in Example 5, the larger screen size showed a better fibre separation performance than the smaller screen. For the 5 mm screen, the separation performance corresponded to 82.3% wood fibre and 16.3% polyester fibre with fibre losses of 1.4%. For the 8 mm screen, the corresponding values were 84.4% wood fibre and 13.6% polyester fibre with fibre losses of 2.0%.

This example showed that the separation of the fibre components of the fibremat press trim residue was successfully done in a continuous and automatic operation of the machine.

TABLE 8A

Fiber Separation Process Using 5-mm Mesh Size Screen
Continuous automatic operation

| | | |
|---|---|---|
| Total operation time: | 19.25 minutes | |
| Total weight of material (g): | 1068.52 | |
| Total # of batches processed: | 33 | |
| Average batch weight (g): | 32.38 | |
| Weight of wood fiber: | 865.62 g | 81.01% |
| Weight of polyester fiber: | 184.62 g | 17.28% |
| Loss of material in the process: | 18.28 g | 1.71% |

TABLE 8B

| | | |
|---|---|---|
| Total operation time: | 21.00 minutes | |
| Total weight of material (g): | 1128.46 | |
| Total # of batches processed: | 36 | |
| Average batch weight (g): | 31.35 | |
| Weight of wood fiber: | 946.23 g | 83.85% |
| Weight of polyester fiber: | 159.76 g | 14.1 6% |
| Loss of material in the process: | 22.47 g | 1.99% |

TABLE 8C

| | | |
|---|---|---|
| Total operation time: | 21.00 minutes | |
| Total weight of material (g): | 1114.06 | |
| Total # of batches processed: | 36 | |
| Average batch weight (g): | 30.95 | |
| Weight of wood fiber: | 911.71 g | 81.84% |
| Weight of polyester fiber: | 193.88 g | 17.40% |
| Loss of material in the process: | 8.47 g | 0.76% |

TABLE 8D

| | | |
|---|---|---|
| Overall average batch size (gm): | 31.53 | |
| Overall operation time (minutes): | 61.25 | |
| Overall weight of loosened material (gm): | 3311.04 | 100.0% |
| Overall weight of separated wood fiber (gm): | 3723.56 | 82.3% |
| Overall weight of separated polyester fiber (gm): | 538.26 | 16.3% |

TABLE 9A

Fiber Separation Process Using 5-mm Mesh Size Screen
Continuous automatic operation

| | | |
|---|---|---|
| Total weight of material (g): | 475.75 | |
| Total # of batches processed: | 15 | |
| Average batch weight (g): | 31.72 | |
| Weight of wood fiber: | 398.22 g | 83.70% |
| Weight of polyester fiber: | 68.36 g | 14.37% |
| Loss of material in the process: | 9.17 g | 1.93% |

TABLE 9B

| | | |
|---|---|---|
| Total weight of material (g): | 464.67 | |
| Total # of batches processed: | 15 | |
| Average batch weight (g): | 30.98 | |
| Weight of wood fiber: | 395.67 g | 85.15% |
| Weight of polyester fiber: | 59.55 g | 12.82% |
| Loss of material in the process: | 9.45 g | 2.03% |

TABLE 9C

| Overall average batch size (gm): | 31.35 | |
|---|---|---|
| Overall operation time (minutes): | 17.50 | |
| Overall weight of loosened material (gm): | 940.42 | 100.0% |
| Overall weight of separated wood fiber (gm): | 793.89 | 84.4% |
| Overall weight of separated polyester fiber (gm): | 127.91 | 13.6% |

Various changes may be made to the embodiments disclosed herewith without departing from the scope of the present invention which is limited only by the following claims.

The embodiments of the present invention in which an exclusive property or privilege is claimed are defined as follows:

1. Apparatus for separating wood fibres from other fibres in fibremat residues, comprising:

a feed chute for fibremat residues leading to a control chamber;

a cutting and separating chamber below the control chamber having at least one rotatable cutting head therein adapted to cut up the fibremat residues and separate the wood fibres from the other fibres;

rotating means to rotate the cutting head at a speed to cut the fibremat residues;

a screen positioned below the cutting and separating chamber having mesh size to permit wood fibres to pass therethrough;

wood fibre collection system to collect wood fibres that pass through the screen;

a fibre vacuum connector above the cutting and separating chamber for a vacuum system to remove the other fibres from the control chamber; and an upper gate in the feed chute above the control chamber and a side gate in the control chamber leading to the fibre vacuum connector.

2. The apparatus for separating wood fibres according to claim 1 wherein the wood fibre collection system includes a vacuum system to collect wood fibres that pass through the screen.

3. The apparatus for separating wood fibres according to claim 1 including a compressed air system to provide compressed air to the feed chute to assist in feeding fibremat residues into the cutting and separating chamber.

4. The apparatus for separating wood fibres according to claim 1 including a first pneumatic cylinder for operating the upper gate and a second pneumatic cylinder for operating the side gate.

5. The apparatus for separating wood fibres according to claim 4 including an automatic control system to control the sequence of operations to open and close the upper gate and the side gate.

6. The apparatus for separating wood fibres according to claim 1 including means to vary the rotating speed of the cutting head.

7. The apparatus of separating wood fibres according to claim 1 wherein the cutting head includes first and second spaced apart rotating cutting blades.

8. The apparatus for separating wood fibres according to claim 7 including a stationary cutting blade to cut the fibremat residues in association with the two rotating cutting blades.

9. The apparatus for separating wood fibres according to claim 1 wherein the screen has a 5 mm mesh size.

10. The apparatus for separating wood fibres according to claim 1 wherein the screen has an 8 mm mesh size.

* * * * *